United States Patent
Conroy et al.

(10) Patent No.: US 7,965,941 B2
(45) Date of Patent: Jun. 21, 2011

(54) MULTICHANNEL OPTICAL TRANSPORT NETWORK TIME DOMAIN REFLECTOMETRY CALIBRATION

(75) Inventors: Keith Conroy, Perkasie, PA (US); Omer Acikel, San Diego, CA (US); Francesco Caggioni, Winchester, MA (US)

(73) Assignee: Applied Micro Circuits Corporation, San Diego, CA (US)

( * ) Notice: Subject to any disclaimer, the term of this patent is extended or adjusted under 35 U.S.C. 154(b) by 552 days.

(21) Appl. No.: 12/205,776

(22) Filed: Sep. 5, 2008

(65) Prior Publication Data

US 2010/0061731 A1    Mar. 11, 2010

(51) Int. Cl.
*H04J 14/00* (2006.01)
*H04J 14/08* (2006.01)
*H04B 10/04* (2006.01)
*H04B 10/12* (2006.01)

(52) U.S. Cl. .................... 398/102; 398/53; 398/188

(58) Field of Classification Search .................. 398/21, 398/53, 102, 147, 158, 183, 184, 188, 192
See application file for complete search history.

(56) References Cited

U.S. PATENT DOCUMENTS

2004/0047629 A1 * 3/2004 Evangelides et al. .......... 398/33

* cited by examiner

*Primary Examiner* — Armando Rodriguez
(74) *Attorney, Agent, or Firm* — Law Office of Gerald Maliszewski; Gerald Maliszewski

(57) ABSTRACT

A system and method are provided for controlling time delay in a multichannel optical transport network (OTN) transmission device using time domain reflectometry (TDR) measurements. The method accepts a pair of $2^n$-phase shift keying ($2^n$-PSK) modulated signals via Ix and Qx electrical signal paths, where n>1. Likewise, a pair of $2^p$-PSK modulated signals are accepted via Iy and Qy electrical signal paths where p>1. Using TDR modules, signal reflections are measured from an output port for each signal path. The method minimizes time delay differences in the signal reflections for the Ix, Qx, Iy, and Qy signals paths by using the signal reflection measurements to adjust time delay modules in each signal path.

4 Claims, 3 Drawing Sheets

MULTICHANNEL OPTICAL TRANSPORT NETWORK TIME DOMAIN REFLECTOMETRY CALIBRATION

BACKGROUND OF THE INVENTION

1. Field of the Invention

This invention generally relates to signal communications and, more particularly, to a system and method that uses time domain reflectometry measurements to calibrate for skew errors in a multichannel Optical Transport Network (OTN) transmitter.

2. Description of the Related Art 100 gigabit per second (Gbps) OTN protocols are being developed where the OTN streams are carried in a "parallel fashion" at a bit-rate greater than 100 Gbps. Until recently, optical signals have been carried using modulations techniques carrying 1 bit per symbol. However, the need for faster signal speeds means that return to zero (RZ), non-return to zero (NRZ), and phase-shift keying (PSK) modulation techniques (1 bit per symbol) are no longer suitable.

FIG. 1 is a schematic diagram depicting a system for the transmission of high speed signals (40/100 Gbps and above) using multiplexed orthogonal optical polarization, with 2 bits per symbol per polarization, for a total of 4 bits/symbol. Any skew (differential time delay) experienced in the modulation of the transmitted signal is translated to the receiver, making the recovery of a serial stream from parallel streams difficult.

It would be advantageous if a technique could be developed to minimize differential time delay or skew in the parallel pathways of a multiplexed orthogonally polarized OTN signal.

SUMMARY OF THE INVENTION

The present invention presents a system and method that address electrical skew control between complex envelope channel components, within and between polarization branches. The invention uses signal reflections in the measurement of delay, to calibrate for skew errors through each parallel path.

Accordingly, a method is provided for controlling time delay in a multichannel optical transport network (OTN) transmission device using time domain reflectometry (TDR). The method accepts a pair of $2^n$-phase shift keying ($2^n$-PSK) modulated signals via Ix and Qx electrical signal paths, where n>1. Likewise, a pair of $2^p$-PSK modulated signals are accepted via Iy and Qy electrical signal paths where p>1. Using TDR modules, signal reflections are measured from an output port for each signal path. The method minimizes time delay differences in the signal reflections for the Ix, Qx, Iy, and Qy signals paths by using the signal reflection measurements to adjust time delay modules in each signal path.

The method converts the $2^n$-PSK and $2^p$-PSK signals to $2^n$-PSK and $2^p$-PSK optical signals. The $2^n$-PSK and $2^p$-PSK optical signals are orthogonally polarized and transmitted.

Additional details of the above-described method and a system for using TDR to calibrate a multichannel OTN transmission device are described below.

DETAILED DESCRIPTION

Figure 2:
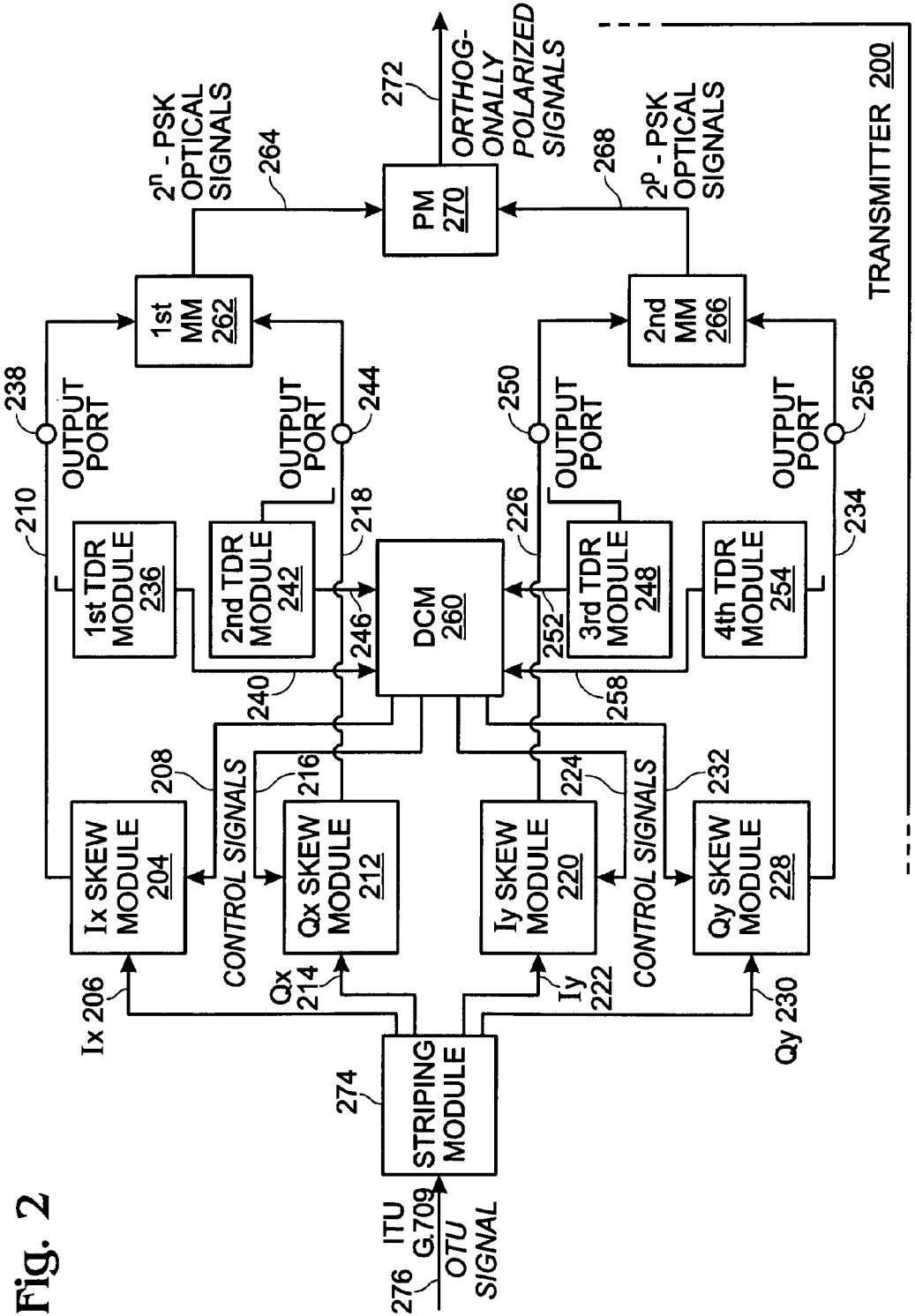
FIG. 2 is a schematic block diagram of a system for controlling time delay in a multichannel optical transport network (OTN) transmission device using time delay reflectometry measurements.

FIG. 2 is a schematic block diagram of a system for controlling time delay in a multichannel optical transport network (OTN) transmission device 200 using time delay reflectometry measurements. The system 202 comprises an Ix skew module 204 having an input on line 206 to accept an Ix signal from a pair of $2^n$-phase shift keying ($2^n$-PSK) modulated signals, where n>1. In one aspect, n=2. However, the system is not limited to any particular value of n. The Ix skew module 204 has a control port on line 208 and an output on line 210 to supply the Ix signal delayed in time in response to signals received at the control port. A Qx skew module 212 has an input on line 214 to accept a Qx signal from the pair of $2^n$-PSK modulated signals. The Qx skew module 212 has a control port on line 216 and an output on line 218 to supply the Qx signal delayed in time in response to signals received at the control port.

An Iy skew module 220 has an input on line 222 to accept an Iy signal from a pair of $2^p$-PSK modulated signals, where p>1. In one aspect, p=2. However, the system is not limited to any particular value of p. Typically, n=p. The Iy skew module 220 has a control port on line 224 and an output on line 226 to supply the Iy signal delayed in time in response to signals received at the control port. A Qy skew module 228 has an input on line 230 to accept a Qy signal from the pair of $2^p$-PSK modulated signals. The Qy skew module 228 has a control port on line 232 and an output on line 234 to supply the Qy signal delayed in time in response to signals received at the control port.

A first time domain reflectometry (TDR) module 236 has an input coupled to the delayed Ix signal on line 210 for measuring signal reflections from an output port 238, and an output on line 240 to supply an Ix reflection measurement signal. In some aspects (not shown), the first TDR module 236 may have an input, e.g., from the Ix skew module or line 210, to accept the transmitted (non-reflected) Ix signal, to provide a reference for reflection measurements. A second TDR module 242 has an input coupled to the delayed Qx signal on line 218 for measuring signal reflections from an output port 244, and an output on line 246 to supply a Qx reflection measurement signal.

A third TDR module 248 has an input coupled to the delayed Iy signal on line 226 for measuring signal reflections from an output port 250, and an output on line 252 to supply an Iy reflection measurement signal. A fourth TDR module 254 has an input coupled to the delayed Qy signal on line 234 for measuring signal reflections from an output port 256, and an output on line 258 to supply a Qy reflection measurement signal.

In other aspects of the system not shown, the TDR modules generate a test signal that is introduced to the delayed Ix, Qx, Iy, and Qy lines, and measures the reflections from these test signals. In this circumstance, the test signals need not necessarily be OTN signals.

A delay control module (DCM) 260 has an input to accept the Ix, Qx, Iy, and Qy reflection measurement signals respectively on lines 240, 246, 252, and 258, and an output to supply signals to the Ix, Qx, Iy, and Qy skew module control ports respectively on lines 208, 216, 224, and 232. The delay control module 260 minimizes time delay differences in the signal reflections for the Ix, Qx, Iy, and Qy signals paths by adjusting time delay modules in each signal path.

A first modulation module (MM) 262 (e.g., a Mach-Zehnder modulator (MZM)) accepts the delayed Ix and Qx signals on lines 210 and 218, respectively, and has an output on line 264 to supply a $2''$PSK optical signal. A second modulation module 266 accepts the delayed Iy and Qy signals on lines 226 and 234, respectively, and supplies a $2^P$PSK optical signal on line 268. In some aspects of the system the TDR modules measure the time delay associated with signals reflected from the input ports of the modulation modules. A polarization multiplexer (PM) 270 has inputs to accepts the $2''$-PSK and $2^P$-PSK optical signals respectively on lines 264 and 268, and has an output on line 272 to supply orthogonally polarized $2''$-PSK and $2^P$-PSK optical signals for transmission.

Typically, the system 202 further comprises a striping module 274 that accepts an ITU G.709 OTN signal on line 276. Striping module 274 performs multiplex processing to provide four parallel paths carrying the $2''$-PSK and $2^P$-PSK electrical signals on lines 206, 214, 222, and 230. Note: although four paths are shown for simplicity, the system 202 is not necessarily limited to just four paths. In the system shown, deskewing operations are performed between the modulation and polarization functions. In other aspects not shown, deskewing calibrations may be performed prior to modulation, or both before and after modulation of the electronic signals (see FIG. 4). The serial OTN signal on line 276 is typically a pseudo-random signal NRZ signal with an average voltage about equal to the midpoint between the signal logic high and logic low values.

Figure 4:
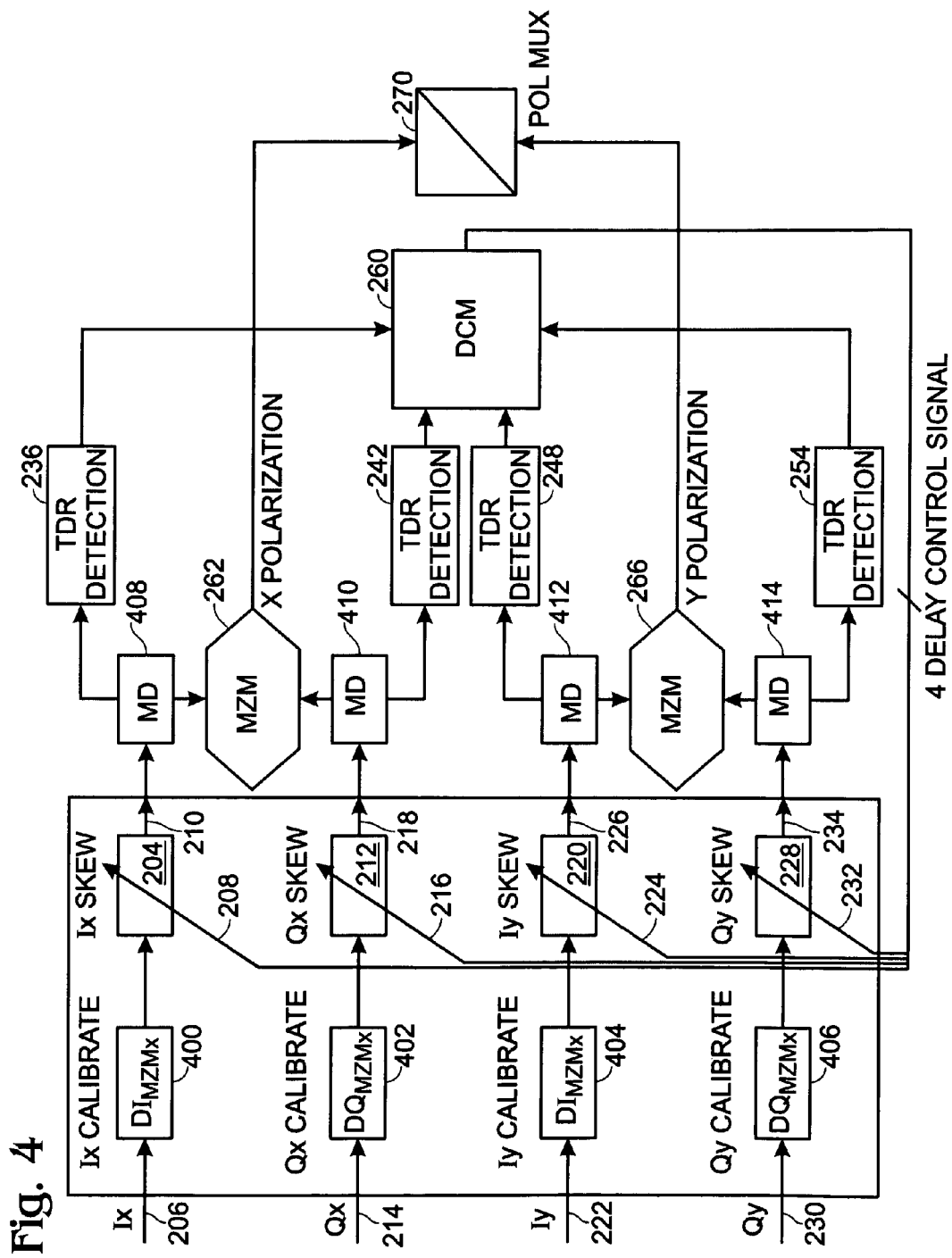
FIG. 4 is a schematic diagram depicting a first variation of the system of FIG. 2.

FIG. 4 is a schematic diagram depicting a first variation of the system of FIG. 2. Calibration modules 400, 402, 404, and 406 are added to lines 206, 214, 222, and 230, respectively. Calibration modules 400-406 may be used to provide a fixed degree of delay in the event that the difference in delays between lines is greater than can be compensated for by the DCM 260. Also shown are modulation drivers (MDs) 408, 410, 412, and 414 interposed between the skew modules and the MZMs.

Functional Description

This system of FIG. 2 takes advantage of the fact that the impedance mismatch with the modulation module input ports causes a reflection. By detecting the reflection amount and timing, skew for each channel can be found and appropriate delay can be dialed to each channel. Advantageously, the time delay measurements are a direct calculation that does not require adaptation—to use of additional signals, such as headers or training sequences, to be detected.

If a signal, e.g., the Ix signal on line 210, is transmitted via a conductor with a uniform impedance that is matched to both the input and output ports, the entire transmitted pulse is absorbed at the output port, and no signal will be reflected. Impedance discontinuities in the transmission system cause some of the incident signal to be sent back towards the source.

The resulting reflected pulse that is measured by a TDR module can be plotted as a function of time. This measurement is aided by the fact that signal propagation is relatively constant for any given transmission medium. The magnitude of the reflection is referred to as the reflection coefficient or $\rho$. The coefficient ranges from 1 (open circuit) to −1 (short circuit). The value of zero means that there is no reflection. The reflection coefficient is calculated as follows:

$$\rho = (Zt - Zo)/(Zt + Zo)$$

where Zo is defined as the characteristic impedance of the transmission medium and Zt is the impedance of the termination at the output port of the transmission line. Any discontinuity can be viewed as a termination impedance and is represented by Zt.

Figure 1:
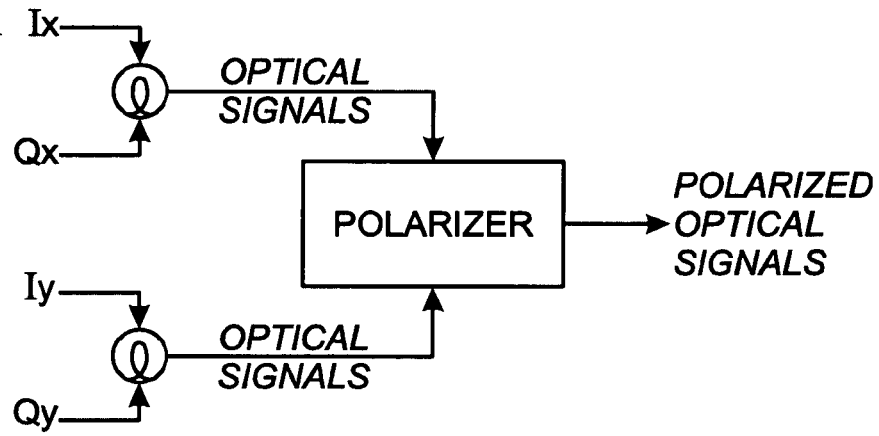
FIG. 1 is a schematic diagram depicting a system for the transmission of high speed signals (40/100 Gbps and above) using multiplexed orthogonal optical polarization, with 2 bits per symbol per polarization, for a total of 4 bits/symbol.
Figure 3:
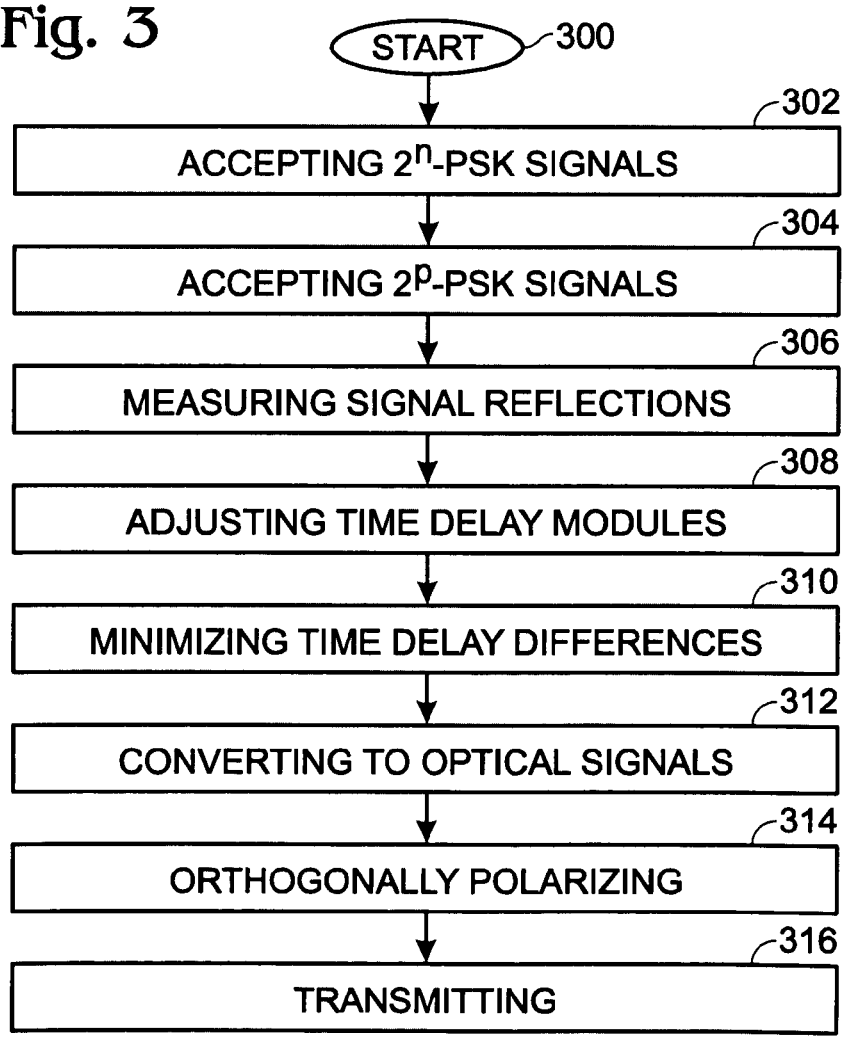
FIG. 3 is a flowchart illustrating a method for controlling time delay in a multichannel OTN transmission device using TDR measurements.

FIG. 3 is a flowchart illustrating a method for controlling time delay in a multichannel OTN transmission device using TDR measurements. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. The method starts at Step 300.

Step 302 accepts a pair of $2''$-phase shift keying ($2''$-PSK) modulated signals via Ix and Qx electrical signal paths, where n>1. Step 304 accepts a pair of $2^P$-PSK modulated signals via Iy and Qy electrical signal paths where p>1. Step 306 measures signal reflections from an output port for each signal path using TDR modules. Step 308 uses the signal reflection measurements to adjust time delay (skew) modules in each signal path. Step 310 minimizes time delay differences in the signal reflections for the Ix, Qx, Iy, and Qy signals paths in response to the time delay module adjustments.

Step 312 converts the $2''$-PSK and $2^P$-PSK signals to $2''$-PSK and $2^P$-PSK optical signals. Step 314 orthogonally polarizes the $2''$-PSK and $2^P$-PSK optical signals. Step 316 transmits the orthogonally polarized signals.

A system and method have been provided for controlling time delay in a multichannel optical transport network (OTN) transmission device using TDR measurements. Explicit circuit details and process steps have been given as examples to illustrate the invention. However, the invention is not necessarily limited to these examples. Other variations and embodiments of the invention will occur to those skilled in the art.

We claim:

1. A method for controlling time delay in a multichannel optical transport network (OTN) transmission device using time delay reflectometry measurements, the method comprising:
   accepting a pair of $2''$-phase shift keying ($2''$-PSK) modulated signals via Ix and Qx electrical signal paths, where n>1;
   accepting a pair of $2^P$-PSK modulated signals via Iy and Qy electrical signal paths where p>1;
   using time domain reflectometry (TDR) modules, measuring signal reflections from an output port for each signal path;
   using the signal reflection measurements to adjust time delay modules in each signal path; and,
   minimizing time delay differences in the signal reflections for the Ix, Qx, Iy, and Qy signals paths in response to the time delay module adjustments.

2. The method of claim 1 further comprising:
   converting the $2''$-PSK and $2^P$-PSK signals to $2''$-PSK and $2^P$-PSK optical signals;
   orthogonally polarizing the $2''$-PSK and $2^P$-PSK optical signals; and,
   transmitting the orthogonally polarized signals.

3. A system for controlling time delay in a multichannel optical transport network (OTN) transmission device using time delay reflectometry measurements, the system comprising:

an Ix skew module having an input to accept an Ix signal from a pair of $2^n$-phase shift keying ($2^n$-PSK) modulated signals, where n>1, the Ix skew module having a control port and an output to supply the Ix signal delayed in time in response to signals received at the control port;

a Qx skew module having an input to accept an Qx signal from the pair of $2^n$-PSK modulated signals, the Qx skew module having a control port and an output to supply the Qx signal delayed in time in response to signals received at the control port;

an Iy skew module having an input to accept an Iy signal from a pair of $2^p$-PSK modulated signals, where p>1, the Iy skew module having a control port and an output to supply the Iy signal delayed in time in response to signals received at the control port;

a Qy skew module having an input to accept an Qy signal from the pair of $2^p$-PSK modulated signals, the Qy skew module having a control port and an output to supply the Qy signal delayed in time in response to signals received at the control port;

a first time domain reflectometry (TDR) module having an input coupled to the delayed Ix signal for measuring signal reflections from an output port, and an output to supply an Ix reflection measurement signal;

a second TDR module having an input coupled to the delayed Qx signal for measuring signal reflections from an output port, and an output to supply a Qx reflection measurement signal;

a third TDR module having an input coupled to the delayed Iy signal for measuring signal reflections from an output port, and an output to supply an Iy reflection measurement signal;

a fourth TDR module having an input coupled to the delayed Qy signal for measuring signal reflections from an output port, and an output to supply a Qy reflection measurement signal; and, a delay control module having an input to accept the Ix, Qx, Iy, and Qy reflection measurement signals, and an output to supply signals to the Ix, Qx, Iy, and Qy skew module control ports, the delay control module minimizing time delay differences in the signal reflections for the Ix, Qx, Iy, and Qy signals paths by adjusting time delay modules in each signal path.

4. The system of claim 3 further comprising:

a first modulation module to accept the delayed Ix and Qx signals, and an output to supply a $2^n$-PSK optical signal;

a second modulation module to accept the delayed Iy and Qy signals, and supply a $2^p$-PSK optical signal; and, a polarization multiplexer having inputs to accept the $2^n$-PSK and $2^p$-PSK optical signals and an output to supply orthogonally polarized $2^n$-PSK and $2^p$-PSK optical signals for transmission.

* * * * *